(12) United States Patent
Böck et al.

(10) Patent No.: US 11,045,918 B2
(45) Date of Patent: Jun. 29, 2021

(54) METHOD FOR DETERMINING AN X-Y-Z REFERENCE COORDINATE OF A WORKPIECE, AND MACHINE TOOL

(71) Applicant: DATRON AG, Mühltal (DE)

(72) Inventors: Benjamin Böck, Brensbach/Wersau (DE); Gregor Leinfelder, Mühltal (DE); Maximilian Barnikol, Ober-Ramstadt (DE)

(73) Assignee: DATRON AG, Mühltal (DE)

( * ) Notice: Subject to any disclaimer, the term of this patent is extended or adjusted under 35 U.S.C. 154(b) by 532 days.

(21) Appl. No.: 16/068,924

(22) PCT Filed: Dec. 20, 2016

(86) PCT No.: PCT/EP2016/081955
§ 371 (c)(1),
(2) Date: Oct. 30, 2018

(87) PCT Pub. No.: WO2017/121585
PCT Pub. Date: Jul. 20, 2017

(65) Prior Publication Data
US 2019/0047106 A1    Feb. 14, 2019

(30) Foreign Application Priority Data

Jan. 11, 2016 (DE) ..................... 10 2016 100 308.5

(51) Int. Cl.
*G01B 5/008* (2006.01)
*B23Q 17/24* (2006.01)
*B23Q 17/22* (2006.01)

(52) U.S. Cl.
CPC ..... *B23Q 17/2409* (2013.01); *B23Q 17/2233* (2013.01); *B23Q 17/249* (2013.01); *B23Q 17/2471* (2013.01); *G01B 5/008* (2013.01)

(58) Field of Classification Search
CPC ........................... B23Q 17/2409; G01B 5/008
(Continued)

(56) References Cited

U.S. PATENT DOCUMENTS

| 5,615,489 A | 4/1997 | Breyer et al. |
| 2005/0151963 A1 | 7/2005 | Pulla et al. |

(Continued)

FOREIGN PATENT DOCUMENTS

| DE | 4327250 | 11/2008 |
| EP | 1777483 B1 | 7/2011 |

(Continued)

*Primary Examiner* — George B Bennett
(74) *Attorney, Agent, or Firm* — Smartpat PLC

(57) ABSTRACT

In a method for referencing a workpiece (2) arranged in a machine tool, an image of the workpiece (2) is first of all created using a camera device (5) of the machine tool and is then displayed on a display device (6). An X-Y display coordinate (9) is selected by a user using the displayed image. A Z reference coordinate is then determined in an automated manner. An X-Y-Z starting coordinate (7) can be calculated on the basis of the Z reference coordinate determined in an automated manner and the X-Y display coordinate (9) input by the user. A measuring probe (8) of the machine tool is then moved in an automated manner to the X-Y-Z starting coordinate (7) and the X-Y-Z reference coordinate of the workpiece (2) is determined on the basis of the position of the measuring probe (8), as predefined by the X-Y-Z starting coordinate (7), by means of a suitable determination method using the measuring probe (8). In order to determine the Z reference coordinate, the measuring probe (8) is moved through the region which can be captured by the camera device (5) along a viewing beam (16) starting from the camera device (5) in the direction of a target point (26) until the measuring probe (8) touches the workpiece (2).

13 Claims, 4 Drawing Sheets

(58) Field of Classification Search
USPC .......................................................... 33/503
See application file for complete search history.

(56) References Cited

U.S. PATENT DOCUMENTS

| | | |
|---|---|---|
| 2007/0086620 A1 | 4/2007 | Arai |
| 2014/0152805 A1 | 6/2014 | Saeki et al. |
| 2014/0182150 A1 | 7/2014 | Nishikawa et al. |
| 2015/0211847 A1* | 7/2015 | Abe ........................ G01B 21/04 |
| | | 33/503 |
| 2015/0253125 A1 | 9/2015 | Pettersson |
| 2015/0285616 A1* | 10/2015 | Jordil ........................ G06K 9/52 |
| | | 348/135 |
| 2015/0345932 A1* | 12/2015 | Wakai .................. G01B 21/047 |
| | | 33/503 |
| 2016/0116276 A1* | 4/2016 | Featherstone .......... G01B 5/012 |
| | | 33/503 |
| 2016/0349034 A1* | 12/2016 | Cobb .................... G01B 11/005 |
| 2016/0364869 A1* | 12/2016 | Siercks .................. H04N 5/247 |
| 2019/0145764 A1* | 5/2019 | Atherton .............. G01B 5/0014 |
| | | 33/503 |
| 2020/0342685 A1* | 10/2020 | Abe ..................... G01B 11/005 |

FOREIGN PATENT DOCUMENTS

| | | |
|---|---|---|
| EP | 2738515 A1 | 6/2014 |
| EP | 2749840 A1 | 7/2014 |
| KR | 101548299 B1 | 9/2015 |

\* cited by examiner

FIG 4
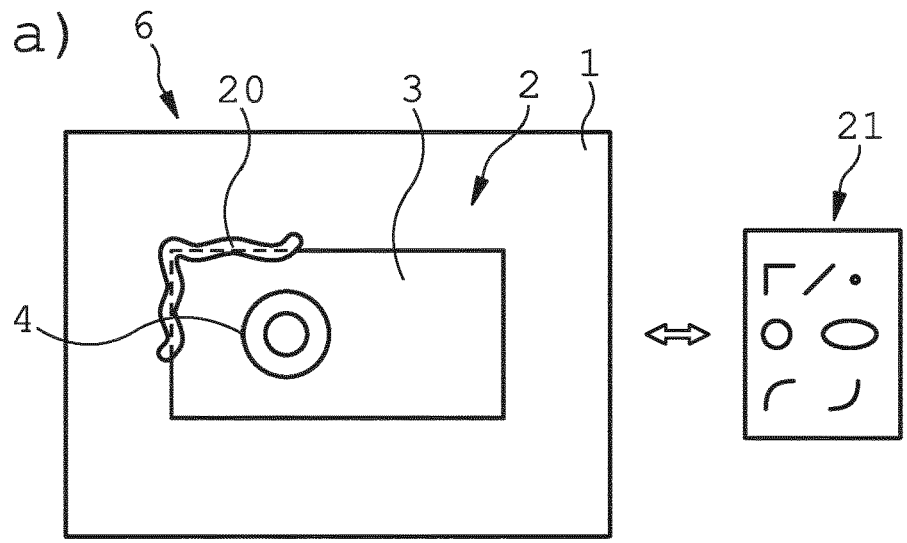
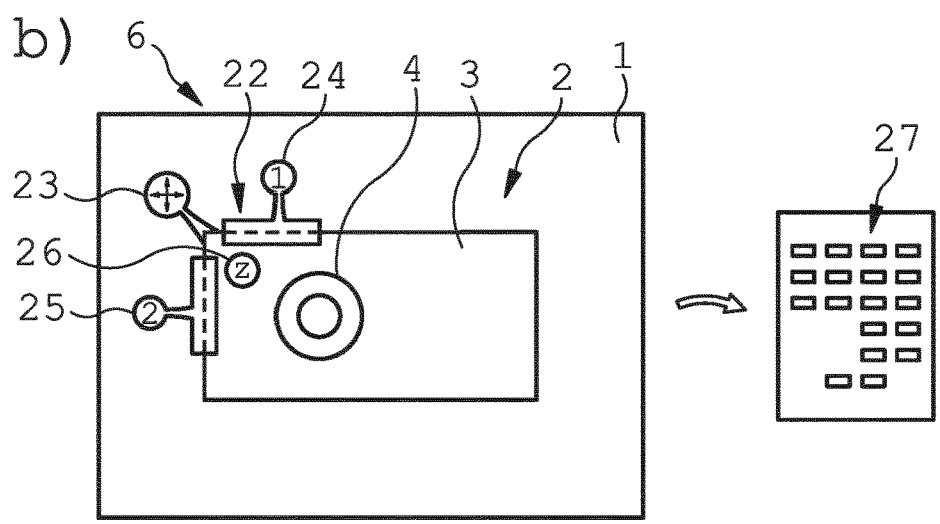
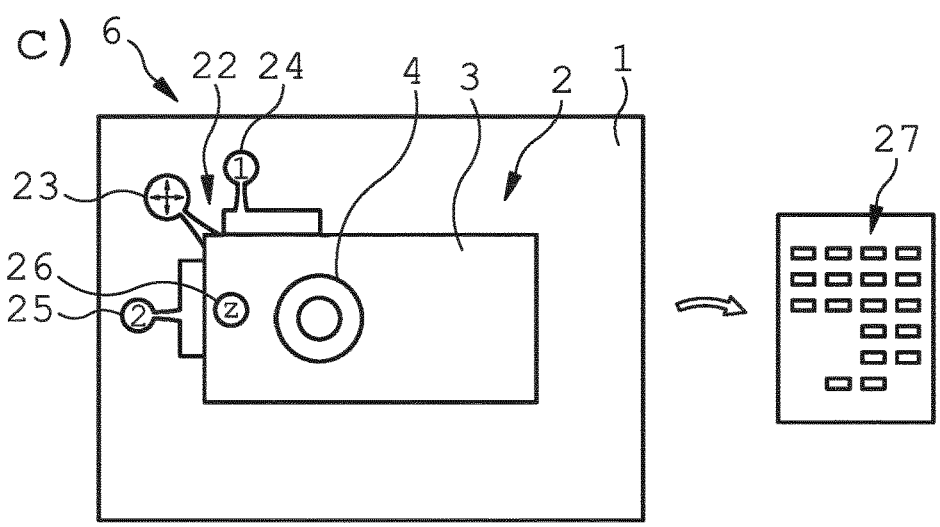

FIG 5
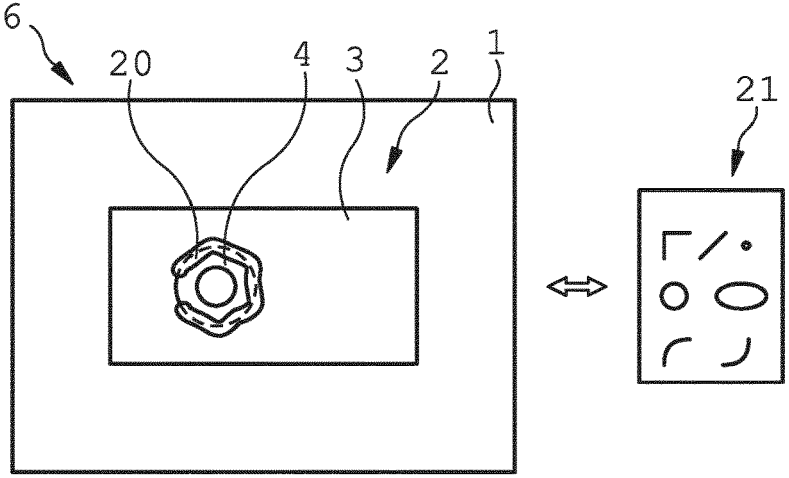
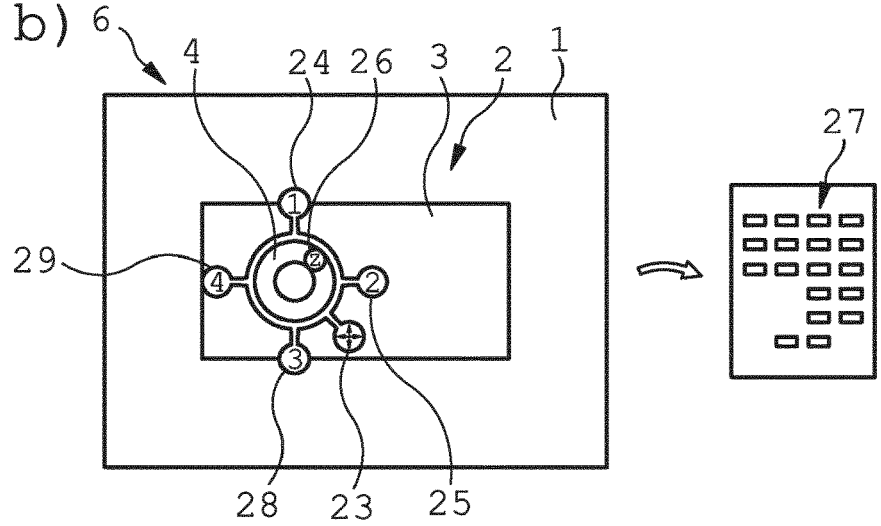
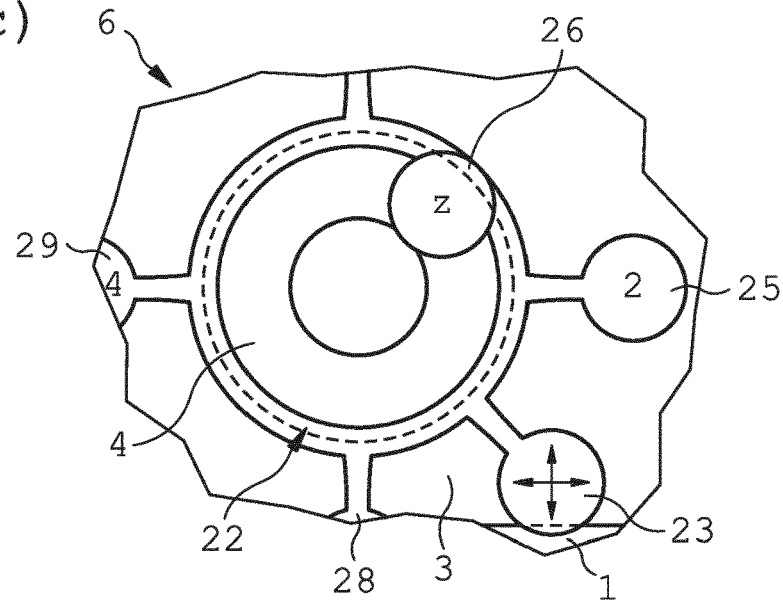

METHOD FOR DETERMINING AN X-Y-Z REFERENCE COORDINATE OF A WORKPIECE, AND MACHINE TOOL

TECHNICAL FIELD

The invention relates to a method for determining a reference coordinate of a workpiece arranged in a machine tool.

BACKGROUND

During the production and machining of a workpiece using a machine tool, referencing the workpiece can be expedient for various reasons to determine its position within the machine tool as precisely as possible. Stops or clamping devices can be used here, for example, which are capable of defining a position of the workpiece in a position urged by the stops or the clamp with high precision. However, in many cases, it is desirable to either additionally or alternatively determine, by measurement, at least one reference coordinate of the workpiece arranged in the machine tool, in order to determine the actual position and, as the case may be, also an orientation of the workpiece in the machine tool based on the reference coordinate.

Even in a workpiece the arrangement of which is defined on a surface of a machining table in the X direction and Y direction by lateral stops, for example, the height of the surface in the Z direction can be re-measured with high precision by referencing, in order to be able to carry out a subsequent machining step with high precision. It is likewise conceivable to interrupt a machining method and remove the workpiece from the machine tool in order to re-arrange it either in the same machine tool or in another machine tool at a later time and carry out a subsequent machining step. In order to perform the machining of the workpiece re-arranged in a machine tool and, as the case may be, continue and finish it after a re-arrangement with a high precision, the position of the workpiece within the machine tool must be re-determined in a manner as precisely as possible and a referencing must be conducted.

It is known in practice that a reference coordinate of the workpiece can be determined by scanning a measuring point or multiple measuring points of a surface of the workpiece with a touch-sensitive measuring probe. One-dimensional or multi-dimensional reference coordinates can completely manually be determined using the measuring probe, wherein a user controls the measuring probe and approaches the measuring probe to a measuring point or multiple times on multiple measuring points of the surface of the workpiece until the probe touches the workpiece.

Furthermore, it is conceivable that a touchless measuring of the distance of the surface of the workpiece to a predetermined and precisely known reference position within the machine tool is carried out, in which laser triangulation methods, optical or acoustic measuring methods can be used, for example.

Automated determination methods have also been developed, which are usually employed in practice. After a corresponding coordinate and parameter input by the user, a determination method operating in an automated manner for determining the reference coordinate is carried out with the control program of the machine tool. A measuring probe can be displaced correspondingly to that end, for example. Based upon a starting coordinate, which is predefined on the surface or in the vicinity of the workpiece, the measuring probe conducts one or multiple pre-determined measuring movements in order to determine at least one reference coordinate by an approach or a touch of the workpiece during the measuring movements. For example, for the determination of a rectangular corner of a workpiece, once its Z reference coordinate has been determined first, two measuring movements can be carried out subsequently, wherein the measuring probe is guided toward the respective lateral edge of the workpiece in a manner as perpendicular as possible on both sides adjacent to the corner, to determine the position of the two lateral edges and thereby determine the position of the corner. Both, the starting coordinate and the individual parameters for the measuring movements during the determination method which is operating in an automated manner, must be input by a user. Even in contactless-measuring measuring devices, determination methods that operate in an automated manner can be defined and predetermined, in order to thereby be able to perform optical or acoustic distance measurements from various directions and evaluate the measuring results, for example.

Furthermore, it is known in practice that a user manually inputs the individual values to the machine tool via an operating device, which are required for the starting coordinate and for the different parameters of the individual measuring movements during the automated determination method. This manual input of the individual values and parameters can, in parts, be made easier or simplified in that the measuring probe is manually guided toward the starting coordinate in order to subsequently perform the individual measuring movements of the measuring probe in accordance with the parameters input through the operating device in the automated determination method. However, a manual approach of the measuring probe requires high precision and experience, especially in a highly rugged surface of a workpiece, in order to prevent an accidental collision with the workpiece during this approach.

It turned out that the input of the starting coordinates and of the individual parameters for the measuring movements of the measuring probe are time-consuming and error-prone. Moreover, the manual input of a larger number of coordinate values and parameters is also time-consuming and requires high concentration when inputting, since an accidentally wrong sign or a wrong decimal point when inputting the values can lead to an undesired displacement of the measuring probe and possibly to a damage of the measuring probe or of the workpiece. Even a manual displacement of the measuring probe within the machining space of the machine tool into the desired starting coordinate is time-consuming and requires experience and skills from the operator.

If the shape and position of the workpiece were at least approximately known to the machine control, a completely automated method for determining the reference coordinate of the workpiece arranged in the machine tool could be performed as well. However, a completely automated performing of the method necessitates that the shape and an approximate position information of the workpiece can be determined previously using suitable sensor devices. The sensor complexity required to that end is significant and leads to additional costs for the production of the machine tool.

SUMMARY

It is regarded an object of the present invention to configure a method for the determination of an X-Y-Z reference coordinate of a workpiece arranged in a machine tool in such a way that determination of the reference coordinate as reliable and fast as possible can be performed with as little effort as possible.

This object is achieved, according to the invention, in that first, an image of the workpiece is created with a camera device of the machine tool and subsequently displayed on a display device of the machine tool, that an X-Y display coordinate is selected and input by a user via the displayed image, that subsequently the Z reference coordinate is determined in an automated manner, and that the X-Y-Z reference coordinate is determined subsequently based upon the Z reference coordinate determined in an automated manner and the X-Y display coordinate input by the user. In the designations through the individual or combined prefixes X, Y and Z in front of individual coordinate information, it is in each case clarified in which space direction the respective coordinates have a defined value. Thus, the X-Y display coordinate corresponds to a coordinate defined in two dimensions, the position of which is predetermined in the X direction and in the Y direction. The Z reference coordinate is a coordinate defined in one dimension, the position of which is predetermined in the Z direction. The two space directions X and Y span a plane that corresponds to the surface on which the workpiece is arranged—typically the surface of a machining table. The Z direction is oriented perpendicular to the X-Y plane or to the surface on which the workpiece rests, so that the height of the workpiece can be measured along the Z direction.

A major advantage of the method according to the invention lies with the selection or specification of a target point in a two-dimensional image of the workpiece, which is possible for the user in a very simple and reliable manner, without that the user needs to know the height of the workpiece or the surface profile in the region of the target point. The target point represents a location or narrow region on the surface of the workpiece, which is selected by the user and on which or based upon which the X-Y-Z reference coordinate is to be determined. It is necessary to know the height of the target point or of the workpiece in the region of the target point for a correct conversion of the target point predetermined in the image into an actual space coordinate within the machining space in the machine tool. This height, which is determined by measurement in an automated manner, can either already correspond to the Z reference value or be converted into the Z reference coordinate in an automatized manner using a further measurement, as the case may be. Consequently, the Z reference coordinate does not have to be specified or manually determined separately by the user, but is instead determined in an automated manner, so that errors in the determination of the Z reference coordinate caused by wrong user input or user input that makes little sense are ruled out.

In the case that the workpiece for example abuts against defined lateral stops and therefore an X-Y reference coordinate is already determined and known, the still missing information can be obtained and the X-Y-Z reference coordinate can be determined by the automated determination of the Z reference coordinate. In the case that the position of the workpiece on the table of the machine tool is not known with sufficient precision, an automated determination of the X-Y-Z reference coordinate can be effected in the knowledge of the Z reference coordinate.

Based upon the X-Y display coordinate input by the user and the Z reference coordinate determined in an automated manner, the X-Y display coordinate defined by the two-dimensional image can be converted into actual space coordinates within the machining space of the machine tool, or into the X-Y reference coordinate, for example likewise in an automated manner, wherein the X-Y reference coordinate, together with the Z reference coordinate, leads to the X-Y-Z reference coordinate defined in the machining space. To that end, known geometrical relations between the two-dimensional image of the workpiece and the Z reference coordinate measured on the target point can be use and evaluated. Yet further options will be described in the following to determine the sought-after X-Y-Z reference coordinate based upon this information using an automated determination method.

The camera device may include a cost-favorable camera, which can capture two-dimensional images. Since the camera device is not used for measurements which are required for the determination of the X-Y-Z reference coordinate and go into the result values, but instead merely is to enable the user an orientation within the machining space as well as a suitable definition of a target point, or of the X-Y display coordinates, the camera device does not have to meet especially high quality requirements.

In the event that the camera device is arranged in a stationary manner inside the machine tool, or above the machining space, which is located above the surface in which the workpiece rests, the image of the workpiece can be captured only from this predetermined camera position. Depending on the position of the camera device during the capturing of the image relative to the workpiece, regions of the surface of the workpiece can be concealed or be depicted in a heavily distorted manner. However, distortions or the risk of an accidental covering of a region of the workpiece are low in flat workpieces.

It is likewise possible that the camera device can be arranged in a manner to be displaceable in the X-direction and Y-direction, so that the user is capable of capturing an image of the workpiece from various viewing directions. In the event that individual surface regions of the workpiece, which are of special interest to the user and would eventually lend themselves as a parameter of an X-Y display coordinate, are covered by other regions of the workpiece and are therefore not discernable in a first image, the user can displace the camera device and capture a further image of the workpiece, which is better suited for their purposes, which is then displayed on the display device.

However, based upon the image of the workpiece, which is captured by the camera device and displayed in the display device, the Z reference coordinate can not readily be determined. The Z reference coordinate could be determined by a suitable sensor device, for example in a contactless manner by a stereoscopic measuring device or by an ultrasound measuring device. Thus, by the capturing of two images of the workpiece from different viewing directions, the surface contour or a height profile of the workpiece could be determined, in order to thereby be able to determine and specify the Z reference coordinate.

It is likewise possible and expedient for many applications to use a measuring probe as the measuring device for the determination of the Z reference coordinate and also the X-Y-Z reference coordinate, by means of which the first contact of the measuring probe with the workpiece can be measured in a measuring movement toward the workpiece, and be translated into a coordinate value. The user can manually specify measuring movements for the measuring probe, or effect a partial automation and select individual measuring movements from a predetermined selection of measuring movements and have them respectively carried out in an automated manner.

For the determination of the Z reference coordinate, the measuring probe can be approached to the workpiece at approximately a right angle from above, until the measuring probe arrives at the surface of the workpiece and the Z reference coordinate is determined either directly on the surface or at a defined small distance above the workpiece. To avoid an undesired damage of the measuring probe during approaching the surface of the workpiece, the measuring probe must be guided toward the workpiece at the velocity of the measuring movement intended for measuring movements. This measuring movement velocity is subrationally slower than a displacement velocity, by means of which the measuring head can be displaced, if a collision with the workpiece is ruled out and no measurements are performed by means of the measuring probe.

Due to the fact that the shape and the height profile of the surface of the workpiece are not known based upon the two-dimensional image of the workpiece, which has been captured with the camera device, and can also not be readily determined, there is a risk that the measuring probe collides with another region of the workpiece during its approach to the Z reference coordinate before the measuring probe arrives at the surface region of the workpiece predetermined for the determination of the Z reference coordinate.

The measuring probe can be displaced for the determination for the Z reference coordinate through the visual range that can be captured by the camera device within the machining space of the machine tool in the direction of target point specified by the user separately, as the case may be, until the measuring probe contacts the workpiece. The target point, which is defined to be two-dimensional or three-dimensional dependent upon the implementation of the method, can correspond to a virtual projection of the X-Y display coordinate onto a surface of a machining table, which can be expedient in particular in flat workpieces or in workpieces with a small surface profiling. Furthermore, in an orientation of the camera device essentially perpendicular above the X-Y display coordinate, the X-Y display coordinate can be used as a suitable target point at the height of the surface of the machining table.

According to a particularly advantageous configuration of the inventive concept, it is provided that first an X-Y-Z starting coordinate is computed for the determination of the X-Y-Z reference coordinate based upon the Z reference coordinate determined in an automated manner and the X-Y display coordinate input by the user, and that a measuring device of the machine tool is displaced to the X-Y-Z starting coordinate in an automated manner, and wherein subsequently the X-Y-Z reference coordinate is determined based upon the now predetermined position of the measuring device by a suitable, typically automated determination method using the measuring device. In knowledge of the Z reference coordinate, the X-Y display coordinate selected by the user on the display device can be computed into an X-Y starting coordinate. The Z reference coordinate can also be converted into a Z starting coordinate, wherein in many cases the Z starting coordinate corresponds to the Z reference coordinate plus a predeterminable security distance height, so that the measuring device is located in the X-Y position selected by the user slightly above the workpiece after the displacement into the X-Y-Z starting coordinate. In the knowledge of the X-Y-Z starting coordinate, the determination of the reference coordinate of the workpiece can be started and carried out subsequently using a likewise automated determination method. As a consequence, the user must merely select an X-Y display coordinate in the image plane on the display device, without that the user already knows the actual X-Y-Z starting coordinate in the machining space of the machine tool, to which the measuring device is subsequently displaced. The user may intuitively select and specify the X-Y display coordinate without that operating errors can occur when inputting the X-Y display coordinate.

It is likewise possible that the target point, which is required for the determination of the Z reference coordinate, is specified by the user independently of the X-Y display coordinate based upon the displayed image of the workpiece separately as a second X-Y display coordinate. In this way, the first X-Y display coordinate can be specified in direct vicinity of a corner of the workpiece, which is to be measured for the determination of the X-Y-Z reference coordinate, while the target point for the determination of the Z reference coordinate or at least the Z starting coordinate is specified at a distance to it in surface region of the workpiece discernable on the image, which is suited better for the determination of the Z reference coordinate and can be approached by the measuring probe without risks, for example.

The target point can likewise, based upon the X-Y display coordinate input by the user and an additional height information, be determined as the target point that corresponds, in a virtual projection of the image of the workpiece displayed on the display device onto a surface of a machining table, on which the workpiece rests, to the intersection of a visual beam running from the camera device to a virtual projection with a horizontally height intersection plane input by the user. For example, the user can retrieve the height of the workpiece in a known workpiece from a database, measure it in advance, or make an approximate estimation.

The displacement of the measuring probe can be specified, for example, by suitable additional user input, in such a way that a collision of the measuring probe with the workpiece can be prevented as far as possible, although its contour and surface profile is not yet exactly known based upon the image of the workpiece on the display device. To that end, for example in an image of the workpiece captured perpendicularly above the target point, the measuring probe can be displaced to the position of the camera device, and then be displaced exclusively along the Z direction, in order to approach the target point perpendicularly from above. The user could likewise define a region of the machining zone prohibited to the measuring probe, which subsequently must not be passed by the measuring probe, but instead must be driven around.

In order to be able to prevent an undesired collision in a simple manner without additional user input, it is provided according to a particularly advantageous configuration of the inventive concept that the measuring probe or the measuring device used is displaced along a visual beam starting from the camera device to the target point. The visual beam runs along a virtual light beam starting from the target point here, which runs through a camera lens to the image plane in the camera device and encounters a region of the image plane with an imaging information assigned to the coordinate target point. To put it simply, the visual beam can be regarded a straight connecting line from the target point to a focal point of the camera device.

Due to the fact that the target point, which has been specified by the user via the displayed image of the workpiece, is discernable in the image of the workpiece captured by the camera device, the target point can not be covered by protrusions or formations along the visual beam, which extends from the camera device to the target point on the surface of the workpiece. The measuring probe will encounter, when displaced along the visual beam independently from the height of the surface of the workpiece, the surface of the workpiece in the surface region defined by the target point, which corresponds to the surface region selected by the user through the X-Y display coordinate or through the separately specified coordinate target point in the image of the workpiece displayed with the display device.

All surface regions discernable in the image of the workpiece displayed on the display device can be approached by the measuring probe along the visual beam running from the camera device to the respective surface region without any risk. In the case that the desired target point is not discernable in the surface of the workpiece or can not be selected or specified in a simple manner, it can be expedient to capture a further image of the workpiece from another position of the camera device in order to unveil originally covered regions because of the altered viewing angle, in which the X-Y display coordinate and a possibly deviating target point can be specified for the determination of the Z reference coordinate.

Alternatively, it is naturally likewise possible that the Z reference coordinate is determined by a suitable sensor device, without that the measuring probe must be displaced through the machining space of the machine tool all the way to a surface of the workpiece. In the case that the machine tool already has a suitable sensor device for other reasons or other applications, this sensor device can be used, and the method can be accelerated to the determination of the X-Y-Z starting coordinate. The measuring device used for the determination of the X-Y-Z reference coordinate can then be displaced to the already determined and now known X-Y-Z starting coordinate, in order to perform an automated determination method for the determination of the X-Y-Z reference coordinate based upon the X-Y-Z starting coordinate. However, also in this case it is advantageous when the measuring device, respectively the measuring probe, is displaced along a visual beam to the X-Y-Z starting coordinate prior to the start of the determination method or the required measurements or measuring movements for the determination of the X-Y-Z reference coordinate, since a collision with neighboring regions of the workpiece can be ruled-out on this displacement path. A determination of a different displacement path, which can be defined to be free of collisions when knowing the three-dimensional shape of the workpiece determined by the sensor device, is possible, but not required.

According to the invention, a particularly simple and intuitive input of the X-Y display coordinate is made possible in that a graphical input object input by a user for the selection of the X-Y display coordinate on the displayed image is converted to an X-Y selection object in an automated manner, and the X-Y selection object is displayed on the display device in a manner to superimpose the displayed image of the workpiece. The graphical input object can be a graphical symbol, for example, which is converted into an superimposed symbol display and is displayed on the displayed image using an input device such as a computer mouse or a trackball. The superimposed symbol display can be shifted by the user as needed, until the user specifies a final position of the symbol and a selection of the X-Y display coordinate along with it.

When using a touch-sensitive display device, for example a touch display, the user can input the input object also via a gesture recognition directly via the display device with the imaged of the workpiece displayed there. The gesture performed by the user, e.g. a course of a line input with a finger, can then be evaluated and be assigned a predefined category, in order to be able to display the X-Y display object assigned to this category in place of the line input by the user.

The X-Y selection object can have a differently-configured graphical representation dependent upon the type of the reference coordinate or dependent upon the selected determination method. The user can thereby be informed about further information in a graphically and intuitively recognizable manner.

It is likewise possible and particularly advantageous in many cases that the user can input, via the X-Y selection object, further parameters for the automated determination method of the reference coordinates of the workpiece. The graphical representation of the X-Y selection object can include a graphical representation of the individual coordinate information and parameter information which can be recognized by the user intuitively and without any problems. Moreover, changes of individual parameters input by the user via the X-Y selection object can be illustrated graphically and visualized in a very descriptive manner, so that erroneous inputs of the user must attract high attention and can almost be ruled-out.

The invention also relates to a machine tool for the machining of a workpiece, by means of which the above-described method according to the invention can be carried out. To that end, the machine tool comprises a displaceable measuring device and a controller, wherein an X-Y-Z reference coordinate can be determined for the workpiece to be machined with the measuring device by means of a determination method possibly operating in an automated manner. The machine tool also comprises an operating device for inputting control commands by a user, wherein the operating device includes a graphical display device for the display of user inputs. The machine tool further comprises a camera device, by means of which an image of the workpiece arranged in the machine tool can be created and then be displayed on the display device. According to the invention, the machine tool is configured in such a way that a method likewise according to the invention and described above can be performed.

Expediently, the camera device can be displaced relative to the workpiece at least in the X-direction and in the Y-direction. To that end, either the camera device can be displaceable in the X-direction and in the Y-direction, or, if the camera device is arranged in a stationary manner, the workpiece can be displaced in the X-direction and in the Y-direction together with a machining table, on which the workpiece rests. It is also conceivable and expedient for many machine tools that the camera device is displaceable parallel to the surface of the machining table in a direction, for example in the X-direction, and the workpiece can be displaced together with the machining table in another direction perpendicular thereto and, for example, in the Y-direction.

The camera device can be arranged immediately next to the measuring device, which, expediently, should be displaceable in a machining space of the machine tool in an almost arbitrary manner.

According to an advantageous configuration of the inventive concept, it is provided that the camera device and the measuring device are arranged on a machining head of the machine tool. The machining head can per se be mounted on a Z-axis, i.e. be displaceable in the Z-direction.

A cost-efficient and reliably usable measuring device is a measuring probe that generates an evaluable measuring signal upon a touch of the probe head with an object, e.g. the workpiece.

It is advantageous for a most simple, error-free and rapid user input that the display device comprises a touch-sensitive graphical display, so that a user can enter a graphical input object for specifying the X-Y display coordinates by a touching of the graphical display. Furthermore, the user can also modify the graphically illustrated X-Y selection object using a touch-sensitive graphical display in an especially simple manner, and adjust the X-Y-Z starting coordinate as well as specify individual parameters for the determination of the reference coordinate.

The display device can likewise be a display device which is not mechanically connected or at least not permanently mechanically connected to a housing of the machine tool, for example a mobile radio device or an electronic tablet.

Furthermore, it is possible to perform the method according to the invention on conventional machine tools, or machine tools that have already been used with conventional machining methods. To that end, merely the necessary and yet missing components of the machine tool, e.g. a camera device, a graphical display device, a software module for performing the method according to the invention, and an interface device for converting the individual values and commands into the control program of the machine tool must be retro-fit. According to an advantageous configuration of the inventive concept, it is provided then that the parameters specified by the user via the X-Y selection object and, as the case may be, further parameters for the automated determination method are converted into machine parameters, which are transmitted to a controller of the machine tool via the interface device.

BRIEF DESCRIPTION OF THE DRAWINGS

Hereinafter, exemplary embodiments of the inventive concept illustrated in the drawing are explained in greater detail.

FIGS. 4a to 4c show multiple schematic representations of the display of an image of the workpiece, which is respectively superimposed by a graphical input object input by the user or an X-Y selection object.

FIGS. 5a to 5c show multiple schematic representations of the display in an image of the workpiece, which is respectively superimposed with a graphical input object or another X-Y selection object input by the user.

DETAILED DESCRIPTION

Figure 1:
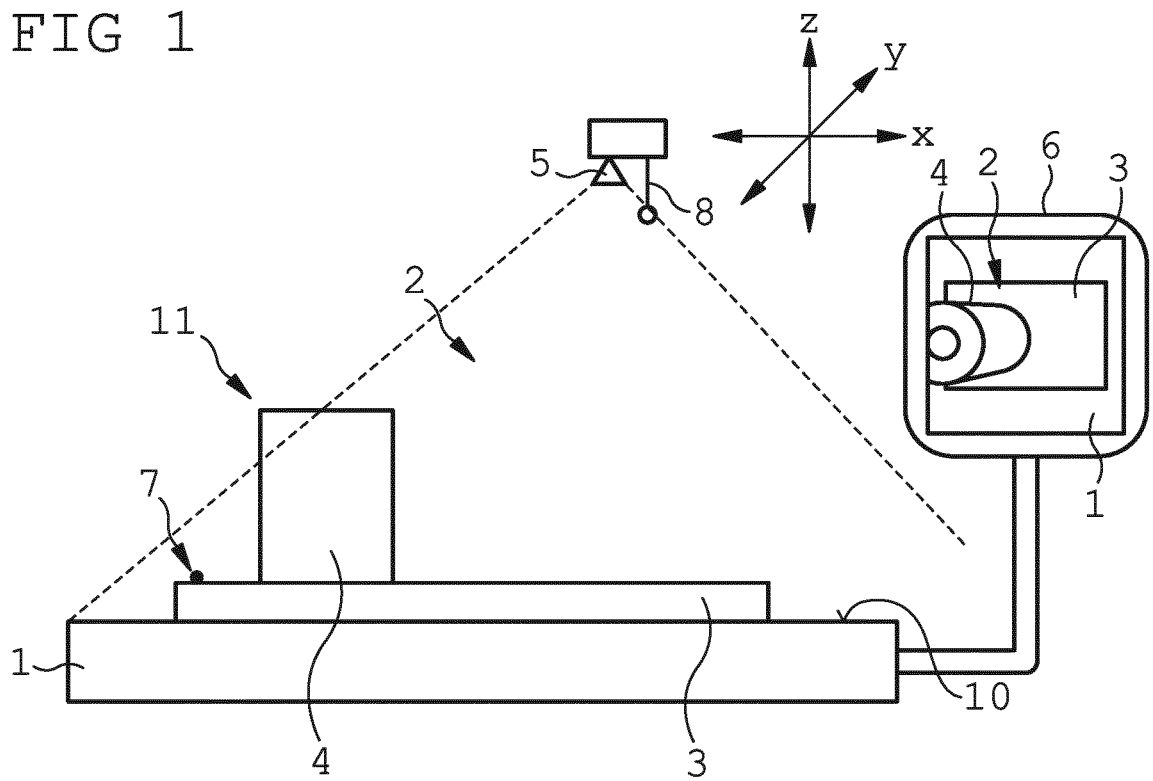
FIG. 1 shows a schematic representation of an image of a workpiece arranged in a machine tool, which has been captured with a camera device of the machine tool, together with the arrangement of the workpiece and the camera device in the machine tool.
Figure 2:
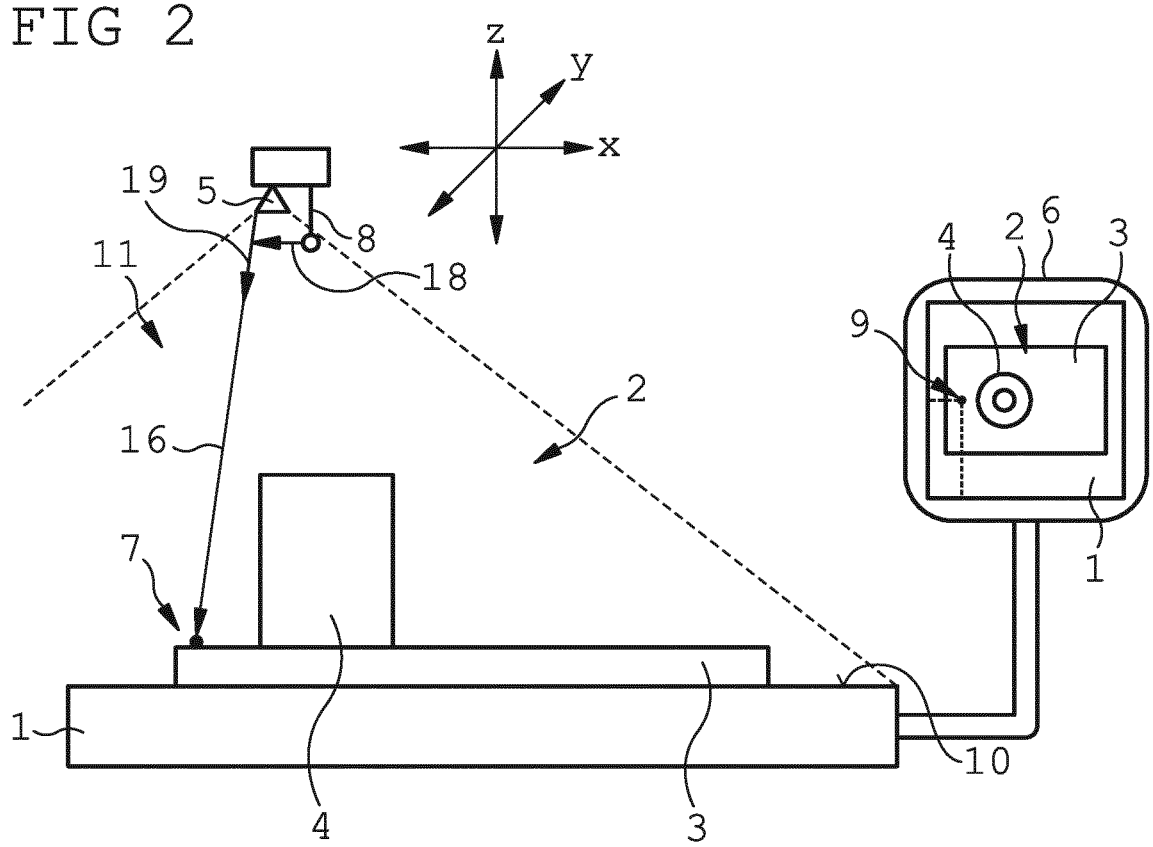
FIG. 2 shows a schematic representation according to FIG. 1, in which the image of the workpiece is captured from a different viewing angle of the camera device.
Figure 3:
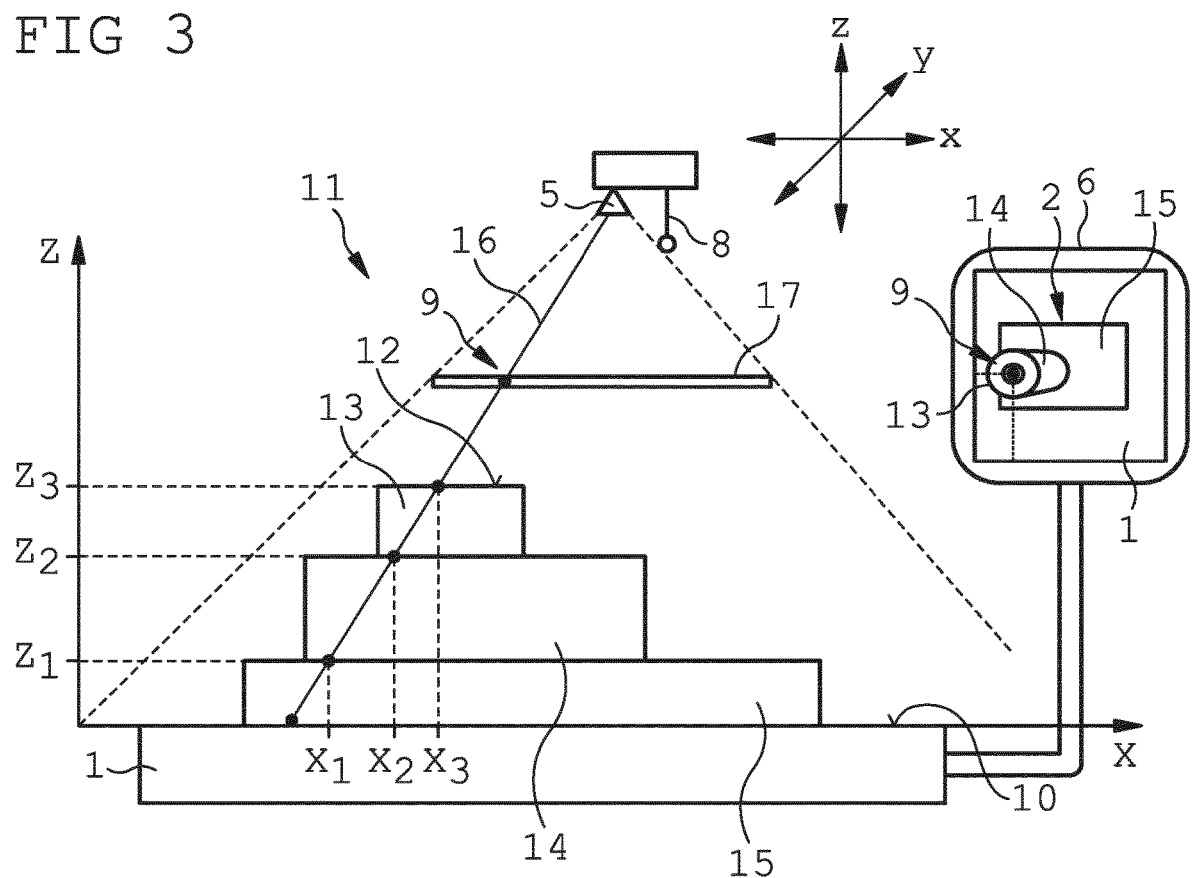
FIG. 3 shows a schematic representation to emphasize the influence of the height of a surface of the workpiece on the coordinate values.

FIGS. 1 to 3 each show a machining table 1 of a machine tool not further illustrated here. A workpiece 2 is arranged in the machining table 1, which workpiece is to be machined in a subsequent machining step. The workpiece 2 comprises a plate-shaped basic element 3 and a protruding hollow-cylindrical formation 4, by way of example. Due to the fact that the position of the workpiece 2 on the machining table 1 is not sufficiently known or cannot be specified in a sufficiently precise manner, a reference coordinate is to be determined, which allows an exact position information of the workpiece 2 on the machining table 1.

A first image of the workpiece 2 is captured by means of a camera device 5, which is arranged on a machining head and which can be displaced relative to the workpiece 2 in all space directions, and displayed on a display device 6 (FIG. 1). Due to the oblique viewing angle of the camera device 5 relative to the orientation of the hollow-cylindrical formation 4 of the workpiece 2, the hollow-cylindrical formation 4 of the workpiece 2 covers neighboring regions of the plate-shaped basic element 3, which are therefore not discernable in the representation of the image displayed on the display device 6.

It is likewise conceivable for a change of the position of the camera device 5 possible in all direction relative to the workpiece 2, that the camera device 5 can be displaced only in one direction parallel to the machining table 1, and the machining table 1 can be displaced relative to the camera device 5 in a direction transversal thereto, for example on a slide.

Based upon an X-Y-Z starting coordinate 7 ultimately specified by the user, the following determination of an X-Y-Z reference coordinate for the workpiece 2 can be performed with a measuring probe 8 by multiple measuring movements. The measuring probe 8 is mounted in direct vicinity to the camera device 5 likewise on the machining head. To specify the X-Y-Z starting coordinate 7, the user can select an X-Y display coordinate 9 on the display device 6, based upon which first the determination of the X-Y-Z starting coordinate 7 is to be effected. It can happen that the X-Y display coordinate 7 intended by the user for various reasons is, however, not located in the discernible region of the plate-shaped basic element 3 of the workpiece 2, or is covered by the hollow-cylindrical formation 4. In this case, the camera device 5 can be displaced horizontally, and a second image of the workpiece 2 can be captured under another viewing angle, so that the regions of the plate-shaped basic element 3 of particular interest to the user can be discerned in the re-captured image (FIG. 2). The user can then select the desired X-Y display coordinate 9 on the display device 6, based upon which the determination of the X-Y-Z starting coordinate 7 is to be effected.

The image of the workpiece 2 visualized on the display device 6 does not contain any information about the height, measured in the Z direction, of the surface regions of the workpiece 2 discernable in this image, wherein the height is defined as a distance above a surface 10 of the machining table 1. Depending upon the viewing direction and the respective height of the discernable surface regions of the workpiece 2, the X-Y display coordinate 9 selected by the user on the display device 6 corresponds to different actual space coordinates x, y, z inside the machining space 11 of the machine tool, which is available above the machining table 1.

FIG. 3 shows, in an exemplary and schematic manner, the influence of the height (measured in the Z direction as a distance to the surface 10 of the machining table 1) of a discernable surface region of the workpiece 2 on the actual space coordinates of the X-Y-Z starting coordinate 7. For the X-Y display coordinate 9 selected by the user on the display device 6, a space coordinate x3 within the machining space 11 results on an upper side 12 of a cylindrical formation 13 having a height z3. In the event that the workpiece 2 did not comprise the cylindrical formation 13, but instead merely an elliptic formation 14 having the height z2, the selected X-Y display coordinate 9 would be assigned to an X-Y-Z starting coordinate 7 having the height z2 and the space coordinate x2. In the case that the workpiece 2 neither comprised the elliptic formation 14 with the height z2, but instead merely a plate-shaped basic element 15 having height z1, the X-Y-Z starting coordinate 7 assigned to the X-Y display coordinate 9 would have a space coordinate x1. In order to, based upon the X-Y display coordinate 9, which the user specifies on the display device 6 based upon the image of the workpiece 2 displayed there, determine the space coordinates of the X-Y-Z starting coordinates 7, to which the measuring probe 8 is to be displaced prior to the start of the measuring movements required for the determination of the X-Y-Z reference coordinate, the height z of the surface region of the workpiece 2 selected by the user must be determined.

It is basically possible to determine the height z of the surface of the workpiece 2 using separate sensor devices, or to specify them using a workpiece database or an estimated value. The measuring probe 8 can likewise be displaced manually to the desired X-Y-Z staring coordinate.

In the method according to the invention, the measuring probe 8 is displaced toward the workpiece 2 along a viewing beam 16, wherein an approach and contacting of the surface of the workpiece 2 is registered by the measuring probe 8 and converted to the Z reference coordinate sought-for. The viewing beam 16 extends in the viewing direction from the camera device 5 through the X-Y display coordinate 9 of the image of the workpiece 2 arranged in a virtual image plane and forms a straight connecting line from the camera device 5 all the way to the surface region of the workpiece 2 defined by the X-Y display coordinate 9.

In the exemplary embodiment schematically illustrated in FIG. 2, the X-Y display coordinate 9 selected by the user also corresponds to a target point used for determining the Z reference coordinate. As the X-Y display coordinate 9 is discernable on the second representation according to FIG. 2, which is displayed on the display device 6, and is not covered by adjacent regions of the workpiece 2, in particular not by the hollow-cylindrical formation 4, the measuring probe 8 can perform a measuring movement all the way to the surface region of the workpiece 2, which is predetermined by the X-Y display coordinate 9 specified by the user, and determine the sought-for Z reference coordinate through a contact with the surface of the workpiece 2. In knowledge of the Z reference coordinate, the complete X-Y-Z reference coordinate can be determined.

FIG. 2 exemplifies the corresponding displacement path of the measuring probe 8. First, the measuring probe 8 is approached to the computed visual beam 16 via an initialization path section 17 at a sufficient distance to the workpiece 2, e.g. at the height of the camera device 5. Thereafter, a measuring movement 19 is effected along the visual beam 16, until the measuring probe 8 impinges on the surface of the workpiece 2.

FIGS. 4a to 4c schematically and exemplarily illustrate various steps of a graphical and interactive user input of all required information for the subsequent automatized determination of the reference coordinate of the workpiece 2.

The image of the workpiece 2 captured by means of the camera device is displayed on a touch-sensitive display device 6. The user can execute a gesture with the finger and thereby enter a graphical input object 20 in the form of a line route. The graphical input object 20 is displayed on the display device 6 in a manner as to superimpose the image of the workpiece 2. The graphical input object 20 is assigned to a category by a comparison with line routes stored in a storage device 21. In the present exemplary case, a rectangular corner of the workpiece 2 is to be measured in order to determine the reference coordinate of the workpiece 2 (FIG. 4a).

The categorized graphical input object 20 is converted to an X-Y selection object 22 and the X-Y selection object is displayed on the display device 6, instead of the graphical input object 20, wherein the displayed image of the workpiece 2 is superimposed and remains visible to the user (FIGS. 4b and 4c).

The X-Y selection object 22 indicates various information related to the planned subsequent measuring movements of the measuring probe 8 for the automated determination of the reference coordinate. Furthermore, the X-Y selection object 22 offers the user various options to change or to adapt individual parameters or specifications for the subsequent measuring movements by means of further graphical inputs, such as gestures, via the touch-sensitive display device 6. The position of the X-Y selection object 22 can be changed by catching and displacing a graphically-illustrated object anchor 23. A starting position for the two intended measuring movements and the length and direction of these relative to the workpiece 2 can be altered by graphically-illustrated measuring movement anchors 24, 25. In addition, the user can specify a target point 26 for determining the Z reference coordinate largely independent of the arrangement of the X-Y selection object. Once the user completed the input, first the Z reference coordinate and subsequently the X-Y-Z starting coordinate can be determined, in order to thereafter determine the sought-for X-Y-Z reference coordinate of the workpiece 2 in an automated determination method.

If the workpiece 2 is located on the machining table 11 in a predetermined and exactly-known position in X direction and in Y-direction, for example via lateral stops or separate clamping means, it may be sufficient, for referencing the workpiece, to determine the Z reference coordinate by means of the method described above.

If required, the user specifications captured graphically and interactively via the graphical input object 20 and subsequently via the X-Y selection object 22 can be re-calculated into machine parameters 27 and likewise be displayed. The machine parameters 27 can be transmitted to a control device of the machine tool with an interface device, in order to subsequently perform the determination method for the Z reference coordinate or the X-Y-Z reference coordinate of the workpiece 2, with a measuring movement or multiple measuring movements of the measuring probe 8. FIGS. 4b and 4c, by way of example, respectively, illustrate value fields arranged in a tabular manner, which fields have to be filled out manually with the corresponding machine parameters 27 for the X-Y-Z starting coordinates 7 and for the individual measuring movements of the measuring probe 8, prior to being able to perform the determination method for determining the reference coordinate of the workpiece 2 with the individual measuring movements of the measuring probe 8. Compared to the manual input of the machine parameters 27, which is error-prone and time-consuming even for experienced users, the method according to the invention allows specifying the required specifications of the user in a simple manner graphically, intuitively and interactively, wherein erroneous specifications can easily be detected and thereby prevented.

FIGS. 5a to 5c show, by way of example, the option for the user to have a deviating referencing conducted for the same workpiece 2. To that end, the user performs a different gesture and generates the graphical input object 20 above the hollow-cylindrical formation 4 with another line route, which route is approximately circular and is likewise approximately adapted to the visual dimensions of the hollow-cylindrical formation 4 (FIG. 5a).

The graphical input object 20, by pattern matching with the categories previously defined in the storage device 21, is converted to the likewise circular X-Y selection object, which is then displayed on the display device 6 instead of the graphical input object 20, whereby the workpiece 2 and in particular the hollow-cylindrical formation 4 are still discernible, owing to the superimposition (FIG. 5b). The X-Y selection object indicates various information related to the planned and subsequent measuring movements of the measuring probe 8 for the automated determination of the reference coordinate, which can be acted on and changed by the user by means of the X-Y-Z selection object 22 as well. The position of the X-Y selection object 22 can be changed by catching and displacing a graphically-illustrated object anchor 23. A starting position for the now four intended measuring movements as well as the length and direction of these relative to the hollow-cylindrical formation 4 of the workpiece 2 can be altered by graphically-illustrated measuring movement anchors 24, 25 as well as 28 and 29. In addition, the user can specify the target point 26 for determination of the Z reference coordinate largely irrespective of the arrangement of the X-Y selection object 22. The X-Y selection object 22 not only allows changing the position, but also the radius of the X-Y selection object 22.

Once the user's input is completed, first the Z reference coordinate and thereafter the X-Y-Y starting coordinate can be determined, in order to then determine the sought-for X-Y-Z reference coordinate of the workpiece 2, in a determination method executed in an automated manner.

The invention claimed is:

1. A method for determining an X-Y-Z reference coordinate of a workpiece arranged in a machine tool, comprising:
    capturing an image of the workpiece with a camera device of the machine tool and displaying the captured image on a display device;
    allowing a user to select and input an X-Y display coordinate via the displayed image;
    determining a Z reference coordinate in an automated manner; and
    determining the X-Y-Z reference coordinate based upon the Z reference coordinate determined in an automated manner and the X-Y display coordinate input by the user.

2. The method according to claim 1, wherein determining the X-Y-Z reference coordinate further comprises:
    computing an X-Y-Z starting coordinate based upon the Z reference coordinate determined in an automated manner and the X-Y display coordinate input by the user;
    displacing a measuring device of the machine tool to the X-Y-Z starting coordinate in an automated manner; and
    determining the X-Y-Z reference coordinate of the workpiece based upon the position of the measuring device defined by the X-Y-Z starting coordinate by means of a suitable determination method by the measuring device.

3. The method according to claim 2,
    wherein the measuring device is a touch-sensitive measuring probe, and
    wherein the touch-sensitive measuring probe is displaced through a region detectable by the camera device in the direction of a target point specified by the user for the determination of the Z coordinate, until the touch-sensitive measuring probe touches the workpiece.

4. The method according to claim 3, wherein the target point corresponds to the X-Y display coordinate or is separately specified on the display device by the user.

5. The method according to claim 3, wherein the touch-sensitive measuring probe is displaced along a viewing beam starting from the camera device in the direction of the target point.

6. The method according to claim 1, wherein the Z reference coordinate is determined by a sensor device.

7. The method according to claim 1,
    wherein, for the selection of the X-Y display coordinate on the displayed image, a graphical input object input by a user is converted to an X-Y selection object in an automated manner, and
    wherein the X-Y selection object is displayed on the display device in a manner as to superimpose the displayed image of the workpiece.

8. The method of claim 7, wherein the user can enter further parameters for the automated determination method of the reference coordinates of the workpiece via the X-Y selection object.

9. The method according to claim 7, wherein the parameters specified by the user via the X-Y selection object and possibly further parameters for the automated determination method are converted to machine parameters, which are transmitted to a controller of the machine tool via an interface device.

10. A machine tool for the machining of a workpiece, comprising:
    a displaceable measuring device;
    a controller for the control of the displaceable measuring device,
        wherein an X-Y-Z reference coordinate of the workpiece intended for machining is determined in a determination method using the measuring device based upon an X-Y-Z starting coordinate;
    an operating device for the input of control commands by a user, comprising a graphical display device for the displaying of user inputs; and
    a camera device, by means of which an image of the workpiece arranged in the machine tool can be captured and subsequently displayed on the graphical display device,
    wherein the machine tool is configured in such a way that the method according to claim 1 can be performed.

11. The machine tool according to claim 10, wherein the camera device and the measuring device are arranged on a machining head of the machine tool.

12. The machine tool according to claim 10, wherein the measuring device is a measuring probe.

13. The machine tool according to claim 10, wherein the display device comprises a touch-sensitive graphical display, so that a user can input a graphical input object for specifying the X-Y display coordinate by touching the graphical display.

* * * * *